United States Patent [19]

Kuroda et al.

[11] 4,061,857

[45] Dec. 6, 1977

[54] PROCESS FOR PREPARING POLYOLEFINS

[75] Inventors: Nobuyuki Kuroda, Yokohama; Takeichi Shiraishi, Kawasaki; Akio Itoh, Yokosuka; Kazuo Matsuura, Kawasaki; Mituji Miyoshi, Kanagawa, all of Japan

[73] Assignee: Nippon Oil Company Ltd., Tokyo, Japan

[21] Appl. No.: 683,965

[22] Filed: May 6, 1976

[30] Foreign Application Priority Data

May 15, 1975 Japan .................................. 50-56747

[51] Int. Cl.$^2$ .......................... C08F 4/02; C08F 10/02
[52] U.S. Cl. ............................... 526/114; 252/429 C; 526/116; 526/119; 526/125; 526/127; 526/352; 526/906
[58] Field of Search ................ 526/114, 125, 156, 116

[56] References Cited

U.S. PATENT DOCUMENTS 3,883,492  5/1975  Delbouill et al. .................... 526/114

FOREIGN PATENT DOCUMENTS 2,342,200  3/1974  Germany.
442,712  2/1969  Japan.
1,352,718  5/1974  United Kingdom.

*Primary Examiner*—Edward J. Smith

[57] ABSTRACT

According to the present invention, there is provided a process for preparing polyolefins which comprises polymerizing or copolymerizing olefins using as catalyst a solid component containing a titanium compound and/or a vanadium compound, and an organoaluminum compound and/or an organozinc compound, said solid component being obtained by copulverizing (1) a magnesium halide and/or a manganese halide, (2) an aluminum oxyhalide and (3) a titanium compound and/or a vanadium compound.

10 Claims, No Drawings

PROCESS FOR PREPARING POLYOLEFINS

BACKGROUND OF THE INVENTION

1. Field of the Invention

This invention relates to a process for preparing polyolefins using a novel polymerization catalyst. More particularly, it is concerned with a process for preparing polyolefins by polymerizing or copolymerizing olefins in the presence of a catalyst consisting of a solid component and an organoaluminum compound and/or an organozinc compound, said solid component being obtained by copulverizing (1) a magnesium halide and/or a manganese halide, (2) an aluminum oxyhalide and (3) a titanium compound and/or a vanadium compound, whereby the yield of polymer per solid and that per transition metal are increased to a remarkable extent resulting in the step of removing residual catalyst in the polymer becoming unnecessary and the molecular weight distribution of the polymer is expanded resulting in the fluidity of the molten polymer beig improved.

2. Description of the Prior Art

In the technical field of this sort, there have heretofore been known many catalysts consisting of, as carrier, an inorganic magnesium solid such as magnesium halide, magnesium oxide and magnesium hydroxide, and a compound of transition metal such as titanium and vanadium supported thereon (see, for example, Japanese Patent Publications Nos. 13050/68 and 9548/70). However, polyolefins prepared by use of such carriers have a relatively narrow distribution of molecular weight; in practical use, they are in some cases preferred in the field of injection molding, but in the field of extrusion molding and blow molding their use results in poor surface condition of the resulting molded article such as the occurrence of shark skin on the surface and thus there is a significant drawback in their practical use. Of course, even with the above-mentioned carriers, it is possible to expand the molecular weight distribution to some extent by the selection of polymerization temperature and cocatalyst, but it has heretofore been impossible to expand the molecular weight distribution to a substantially satisfactory extent.

Ziegler catalysts containing an aluminum oxyhalide as one component are known from Japanese Patent Publication No. 2712/69. Howeger, the activity of such catalyst is not sufficient, far from dispensing with step of removing residual catalyst, and the molecular weight distribution of the resulting polymer is not fully wide and an improvement in fluidity has been desired.

Polyolefins having a wide molecular weight distribution are characterized by having a large flow parameter which is defined by the expression given below. Also in the present invention, this flow parameter will be referred to hereinafter as being indicative of the extent of the molecular weight distribution.

$$\text{Parameter} = \log \left( \frac{\text{Melt index at a load of 21.6 kg}}{\text{Melt index at a load of 2.16 kg}} \right)$$

SUMMARY OF THE INVENTION

As a result of a keen study we have made on a high activity catalyst affording polyolefins having a wide molecular weight distribution, that is, having a large flow parameter, we have found that by polymerizing or copolymerizing polyolefins using as catalyst a solid component and an organoaluminum compound and/or an organozinc compound, said solid component being obtained by copulverizing (1) a magnesium halide and/or a manganese halide, (2) an aluminum oxyhalide and (3) a titanium compound and/or a vanadium compound, there can be obtained with high catalyst efficiency polyolefins having a wide molecular weight distribution, that is, having a large flow parameter, and that by using such polyolefins there can be obtained extrusion moldings having an excellent surface condition and thus the foregoing technical problem in practical use can be solved. In this way, the present invention has been acoomplished.

If there is used a catalyst consisting of a solid component obtained by copulverizing a magnesium halide and/or a manganese halide and a titanium compound and/or a vanadium compound, and an organoaluminum compound and/or an organozinc compound, the resulting polyolefin has a narrow molecular weight distribution. In contrast, if there is used a catalyst consisting of a solid component obtained by copulverizing (1) a magnesium halide and/or a manganese halide, (2) a titanium compound and/or a vanadium compound and (3) an aluminum oxyhalide, and an organoaluminum compound and/or an organozinc compound, the resulting polyolefin has a high activity and a wide molecular weight distribution and is suited for blow and extrusion moldings. This cannot but be considered absolutely unexpected and surprising.

DESCRIPTION OF THE INVENTION

Detailed features of the present invention will be seen by the following description.

As the magnesium halide used in the present invention are mentioned magnesium chloride, magnesium fluoride, magnesium bromide, magnesium iodide, and mixtures thereof, among which magnesium chloride is most preferred.

As the manganese halide used in the present invention, manganese chloride is most preferred. A mixture of a magnesium halide and a manganese halide is also preferably employed in the present invention.

The aluminum oxyhalide used in the present invention is a compound represented by the general formula A1OX wherein X is halogen, namely, fluorine, chlorine, bromine or iodine. There are many known methods for the preparation of this compound, for example, there is known the Menzel process in which aluminum chloride etherate is subjected to thermal decomposition [W. Menzel, Ber. der deutch. Chem., 75, 1055 (1942)]. In the present invention, any A1OX prepared by well known processes can be used. However, in these known methods for the synthesis of aluminum oxyhalide, it is comparatively difficult to obtain a pure compound represented by the foregoing general formula. In contrast, the process of the present invention does not always require a pure aluminum oxyhalide; even the reaction mixture in the preparation of aluminum oxyhalide may be used. For example, an aluminum oxyhalide prepared by the above-mentioned Menzel process may contain a small amount of aluminum chloride etherate, it is fully employable in the present invention.

Titanium compounds used in the present invention are not specially restricted. Illustrative are, as tetravalent titanium compounds, titanium tetrachloride, titanium tetrabromide, titanium tetraiodide, monoethoxytrichlorotitanium, diethoxydichlorotitanium, triethoxymonochlorotitanium, tetraethoxytitanium, titanium tetraisopropoxide, monoisopropoxy trichlorotitanium, diisopropoxy dichlorotitanium, and the reaction product of silicon tetrachloride and titanium alkoxide; and, as trivalent titanium compounds, various titanium trihalides prepared by reducing a titanium tetrahalide with hydrogen, aluminum, titanium or an organometallic compound. Of course, mixtures of these compounds may be used, or rather, two or more titanium compounds are preferably used together if required.

Vanadium compounds used in the present invention are not specially restricted. Illustrative are vanadium oxytrichloride, dichloroethoxyvanadyl, triethoxyvanadyl, vanadium tetrachloride, vanadium trichloride, and mixtures thereof. Of course, the above-mentioned titanium compounds and vanadium compounds may be used together without any trouble. For example, titanium tetrachloride and vanadium tetrachloride are often used in combination.

In the copulverization of a magnesium halide and/or a manganese halide, an aluminum oxyhalide, and a titanium compound and/or a vanadium compound in the present invention, the order of pulverization is not specially restricted. The copulverization may be effected in a simultaneous coexistence of all these components; or a magnesium halide and/or a manganese halide and an aluminum oxyhalide may be pulverized together and thereafter a titanium compound and/or a vanadium compound may be added for further copulverization; or, alternatively, an aluminum oxyhalide and a titanium compound and/or a vanadium compound may be pulverized together and thereafter a magnesium halide and/or a manganese halide may be added for further copulverization. A liquid titanium compound and/or a liquid vanadium compound can be supported by the method in which an aluminum oxyhalide is contacted with the liquid titanium compound and/or the liquid vanadium compound, unreacted liquid titanium compound and/or vanadium compound are (is) removed by washing with an inert hydrocarbon and thereafter a magnesium halide and/or a manganese halide are (is) added followed by application of copulverization. However, the method of supporting a required amount of a titanium compound and/or a vanadium compound by means of copulverization is simpler in the procedure for preparing catalyst and is preferable. Of course, these procedures should be carried out in an inert gas atmosphere and moisture should be avoided as far as possible.

The mixing ratio of a magnesium halide and/or a manganese halide and an aluminum oxyhalide is not specially restricted. However, with a too much amount of an aluminum oxyhalide, the polymerization activity tends to lower, while with a too small amount, the addition of aluminum oxyhalide becomes less effective. Therefore, the molar ratio of magnesium halide and/or manganese halide to aluminum oxyhalide is preferably in the range of from 1:100 to 100:1, and more preferably from 1:10 to 10:1.

The amount of a titanium compound and/or a vanadium compound to be supported is preferably adjusted so that the resulting solid will contain 0.5 to 20% by weight of titanium and/or vanadium; the range of 1 to 10% by weight is specially desirable in order to obtain a well-balanced activity per titanium and/or vanadium and per the solid component. Of course, the mixing ratio of the components should be selected so that solid powders will finally be obtained. This is necessary also from the standpoint of catalyst-handling.

The apparatus used for the copulverization is not specially restricted, but usually employed are ball mill, vibration mill, rod mill and impact mill. Conditions such as the order of mixing, pulverizing time and pulverizing temperature according to the method of pulverization can readily be established by those skilled in the art.

The polymerization reaction of olefins using the catalyst of the present invention is carried out in the same way as in the ordinary olefin polymerization reaction using a Ziegler catalyst. That is, a substantially oxygen- and water-free condition is maintained throughout the reaction. The polymerization conditions for olefins include temperatures ranging from 20° to 300° C, preferably from 50° to 180° C, and pressures from normal to 70 kg/cm², preferably from 2 to 60 kg/cm². Adjustment of molecular weight can be made to some extent by changing polymerization conditions such as the polymerization temperature and the molar ratio of catalyst, but it is effectively made by addition of hydrogen in the polymerization system. Using the catalyst of the present invention, two or more stage polymerization reactions having different polymerization conditions such as different hydrogen concentrations and different polymerization temperatures can of course be made without any trouble.

The process of the present invention can be applied to the polymerization of all olefins that are polymerizable with Ziegler catalysts. For example, it is suitably employed for the homopolymerization of α-olefins such as ethylene, propylene and 1-butene, and for the copolymerization of ethylene and propylene, ethylene and 1-butene, and propylene and 1-butene.

As the organometallic compound used in the present invention, organic compounds of metals from Groups I-IV of the Periodic Table which are known to be a component of Ziegler catalyst, may be employed. Organoaluminum compounds and organozinc compounds are specially preferred. Illustrative are organoaluminum compounds of the general formulae $R_3Al$, $R_2AlX$, $RAlX_2R_2$, $AlOR$, $RAl(OR)X$ and $R_3Al_2X_3$ wherein R is alkyl or aryl and may be the same or different and X is halogen, and organozinc compounds of the general formula $R_2Zn$ wherein R is alkyl and may be the same or different, such as triethylaluminum triisobutylaluminum, trihexylaluminum, trioctylaluminum, diethylaluminum chloride, ethylaluminum sesequichloride, diethylzinc, and mixtures thereof. In the present invention, the amount of these organometallic compounds is not specially restricted, but usually they can be employed in amounts corresponding to 0.1 to 1,000 moles per mole of transition metal halides.

DESCRIPTION OF PREFERRED EMBODIMENTS

The following examples are further illustrative of the present invention. It is to be understood, however, that the invention is not limited thereto.

EXAMPLE 1 a. Preparation of Catalyst 4 g of aluminum oxychloride which had been prepared by thermal decomposition of aluminumdiethyletherate chloride at 190° C and 4 g of a reaction product which had been obtained by reacting (in hexane) titanium tetraisopropoxide with $SiCl_4$ in a molar ratio of 1:3 at 70° C, were placed in a stainless steel pot having a content volume of 400 ml containing 25 stainless steel balls each one-half inch in diameter and a ball milling was applied for 16 hours at room temperature in nitrogen atmosphere. 6.4 g of $MnCl_2$ which had been vacuum-dried for 2 hours at 200° C was then added and a ball milling was further applied for 16 hours at room temperature to give a solid powder containing 55 mg of titanium per g of the solid.

b. Polymerization

A 2 liter stainless steel autoclave equipped with an induction stirrer was purged with nitrogen, in which were then placed 1,000 ml of hexane, 2 millimoles of triethylaluminum and 50 mg of the solid prepared above, and the temperature was raised to 70° C with stirring. The system, which was at a pressure of 1.0 kg/cm².G due to the vapor pressure of hexane, was pressurized with hydrogen to a total pressure of 5.5 kg/cm.²G and then with ethylene to a total pressure of 10 kg/cm².G while a polymerization was started. Ethylene was continuously introduced to maintain the total pressure at 10 kg/cm² and the polymerization continued for 1 hour. The resulting polymer slurry was transferred into a beaker and hexane removed under reduced pressure to yield 112 g of a white polyethylene with a melt index of 0.28. Catalyst activity was 500 g.polyethylene/g. solid·hr.·$C_2H_4$ pressure, 9,050 g.polyethylene/g.Ti·hr.·$C_2H_4$ pressure. The polyethylene had a wide molecular weight distribution, with a large flow parameter of 1.92.

EXAMPLE 2

In the ball mill pot as described in Example 1 were placed 4 g of aluminum oxychloride and 1.2 g of a reaction product which had been obtained by reacting (in hexane) titanium tetraisopropoxide with $SiCl_4$ in a molar ratio of 1:3 at 70° C, and a ball milling was applied for 16 hours at room temperature in nitrogen atmosphere. 3.2 g of $MnCl_2$ was then added and a ball milling was further applied for 16 hours at room temperature in nitrogen atmosphere to give a solid powder containing 29 mg of titanium per g of the solid.

A polymerization was conducted for 1 hour in the same way as in Example 1 except that 131 mg of the solid prepared above was used, to yield 125 g of a white polyethylene with a melt index of 0.36 and a flow parameter of 1.83. Catalyst activity was 210 g.polyethylene/g.solid·hr.·$C_2H_4$ pressure, 7,330 g.polyethylene/g.Ti·hr.·$C_2H_4$ pressure.

COMPARATIVE EXAMPLE 1

A solid powder was prepared and polymerization conducted in the same way as in Example 1 except that aluminum oxychloride was not used, to yield polyethylene with a melt index of 0.47. The polyethylene had a narrow molecular weight distribution, with a flow parameter of 1.60 which was apparently smaller than that in Example 1.

EXAMPLE 3

In the ball mill pot as described in Example 1 were placed 3.6 g of aluminum oxychloride, 3.6 g of a reaction product which had been obtained by reacting (in hexane) titanium tetraisopropoxide with $SiCl_4$ in a molar ratio of 1:3 at 70° C, 5.7 g of $MnCl_2$ and 2.9 g of $TiCl_3$ · ⅓ $AlCl_3$, and a ball milling was applied for 16 hours at room temperature in nitrogen atmosphere. 6.1 g of a solid powder, which had been obtained by subjecting 10 g of $MgCl_2$ and 1.38 g of $TiCl_4$ to ball milling for 16 hours at room temperature in nitrogen atmosphere, was then added and a ball milling was further applied for 16 hours at room temperature in nitrogen atmosphere to give a solid powder containing 75 mg of titanium per g of the solid.

A polymerization was conducted for 1 hour in the same way as in Example 1 except that 20 mg of the solid prepared above was used, to yield 123 g of a white polyethylene with a melt index of 0.13 and with an extremely large flow parameter of 2.28. Catalyst activity was 1,370 g.polyethylene/g.solid·hr.·$C_2H_4$ pressure, 18,200 g.polyethylene/g.Ti·hr.·$C_2H_4$ pressure.

EXAMPLE 4

A polymerization was conducted in the same way as in Example 3 except that hydrogen was at a pressure of 5 kg/cm.²G and ethylene 4 kg/cm.²G to yield 115 g of a white polyethylene with a melt index of 0.35 and with an extremely large flow parameter of 2.00. Catalyst activity was 1,440 g.polyethylene/g.solid·hr.·$C_2H_4$ pressure, 19,200 g.polyethylene/g.Ti·hr.·$C_2H_4$ pressure.

EXAMPLE 5

A polymerization was conducted in the same way as in Example 3 except that hydrogen was at a pressure of 5.4 kg/cm.²G and ethylene 3.6 kg/cm.²G to yield 110 g of a white polyethylene with a melt index of 0.89 and with an extremely large flow parameter of 1.80. Catalyst activity was 1,530 g.polyethylne/g.solid·hr.·$C_2H_4$ pressure, 20,400 g.polyethylene/g.Ti·hr.·$C_2H_4$ pressure.

COMPARATIVE EXAMPLE 2

A solid powder was prepared and polymerization conducted in the same way as in Example 3 except that aluminum oxychloride was not used, to yield 120 g of polyethylene with a melt index of 0.41. The polyethylene had a flow parameter of 1.68 which was apparently smaller than that in Example 3.

EXAMPLE 6

In the ball mill pot as described in Example 1 were placed 4.7 g of aluminum oxychloride, 0.43 g of $TiCl_4$, 0.7 g of titanium tetraisopropoxide and 0.4 g of $TiCl_3$ · ⅓ $AlCl_3$, and a ball milling was applied for 16 hours at room temperature in nitrogen atmosphere. 23.3 g of $MnCl_2$ was then added and a ball milling was further applied for 16 hours at room temperature in nitrogen atmosphere to give a solid powder containing 33 mg of titanium per g of the solid.

A polymerization was conducted for 1 hour in the same way as in Example 1 except that 20 mg of the solid prepared above was used, to yield 40 g of a white polyethylene with a melt index of 0.25 and with an extremely large flow parameter of 1.88. Catalyst activity was 440 g.polyethylene/g.solid·hr.·$C_2H_4$ pressure, 13,500 g.polyethylene/g.Ti·hr.·$C_2H_4$ pressure.

COMPARATIVE EXAMPLE 3

A solid powder was prepared and polymerization conducted in the same way as in Example 6 except that aluminum oxychloride was not used, to yield 38 g of polyethylene with a melt index of 0.35. The polyethylene had a flow parameter of 1.68 which was obviously smaller than that in Example 6.

EXAMPLE 7

In the ball mill pot as described in Example 1 were placed 5 g of aluminum oxychloride, 0.8 g of titanium tetranormalbutoxide, 0.44 g of $TiCl_4$ and 0.42 g of $TiCl_3 \cdot \frac{1}{3} AlCl_3$, and a ball milling was applied for 16 hours at room temperature in nitrogen atmosphere. 4 g of $MnCl_2$ was then added and a ball milling was further applied for 16 hours at room temperature in nitrogen atmosphere to give a solid powder containing 30 mg of titanium per g of the solid.

A polymerization was conducted for 1 hour in the same way as in Example 1 except that 20 mg of the solid prepared above was used, to yield 37 g of a white polyethylene with a melt index of 0.23 and with an extremely large flow parameter of 1.86. Catalyst activity was 410 g.polyethylene/g.solid.hr.·$C_2H_4$ pressure, 13,700 g.polyethylene/g.Ti·hr.·$C_2H_4$ pressure.

EXAMPLE 8

In the ball mill pot as described in Example 1 were placed 6.0 g of aluminum oxyiodide and 4.0 g of a reaction product which had been obtained by reacting (in hexane) titanium tetraisopropoxide with $SiCl_4$ in a molar ratio of 1:3 at 70° C, and a ball milling was applied for 16 hours at room temperature in nitrogen atmosphere. 6.0 g of $MnCl_2$ was then added and a ball milling was further applied for 16 hours at room temperature in nitrogen atmosphere to give a solid powder containing 75 mg of titanium per g of the solid.

A polymerization was conducted for 1 hour in the same way as in Example 1 except that 50 mg of the solid prepared above was used, to yield 100 g of a white polyethylene with a melt index of 0.28 and a flow parameter of 1.90. Catalyst activity was 440 g.polyethylene/g.solid·hr.·$C_2H_4$ pressure, 7,800 g.polyethylene/g.Ti.hr.·$C_2H_4$ pressure.

EXAMPLE 9

In the ball mill pot as described in Example 1 were placed 4.0 g of aluminum oxychloride and 4.0 g of a reaction product which had been obtained by reacting (in hexane) titanium tetraisopropoxide with $SiCl_4$ in a molar ratio of 1:3 at 70° C, and a ball milling was applied for 16 hours at room temperature in nitrogen atmosphere. 2.0 g of $MgCl_2$ was then added and a ball milling was further applied for 16 hours at room temperature in nitrogen atmosphere to give a solid powder containing 100 mg of titanium per g of the solid.

A polymerization was conducted for 1 hour in the same way as in Example 1 except that 50 mg of the solid prepared above was used, to yield 150 g of a white polyethylene with a melt index of 0.20 and a flow parameter of 1.80. Catalyst activity was 670 g.polyethylene/g.solid·hr.·$C_2H_4$ pressure, 6,670 g.polyethylene/g·Ti·hr.·$C_2H_4$ pressure.

COMPARATIVE EXAMPLE 4

A solid powder was prepared in the same way as in Example 9 except that aluminum oxychloride was not used and a polymerization conducted using the solid thus prepared in the same procedure as in Example 1 to yield 160 g of polyethylene with a melt index of 0.50 and with a small flow parameter of 1.59.

EXAMPLE 10

In the ball mill pot as described in Example 1 were placed 4.0 g of aluminum oxychloride, 1.9 g of $TiCl_4$ and 6.4 g of $MnCl_2$, and a ball milling was applied for 16 hours at room temperature in nitrogen atmosphere to give a solid powder containing 40 mg of titanium per g of the solid.

A polymerization was conducted for 1 hour in the same way as in Example 1 except that 32 mg of the solid prepared above was used, to yield 100 g of a white polyethylene with a melt index of 0.32 and a flow parameter of 1.93. Catalyst activity was 690 g.polyethylene/g.solid·hr.·$C_2H_4$ pressure, 17,400 g.polyethylene/g.Ti·hr.·$C_2H_4$ pressure.

Comparative Example 5

A solid powder was prepared in the same way as in Example 10 except that aluminum oxychloride was not used and a polymerization conducted using the solid thus prepared in the same procedure as in Example 1 to yield 120 g of polyethylene with a melt index of 0.50 and with a small flow parameter of 1.60.

EXAMPLE 11

In the ball mill pot as described in Example 1 were placed 4.0 g of aluminum oxychloride, 0.85 g of $TiCl_4$, 0.9 g of $VCl_4$ and 6.4 g of $MnCl_2$, and a ball milling was applied for 16 hours at room temperature in nitrogen atmosphere to give a solid powder containing 20 mg of titanium per g of the solid. A polymerization was conducted for 1 hour in the same way as in Example 1 except that 64 mg of the solid prepared above was used, to yield 120 g of a white polyethylene with a melt index of 0.30 and a flow parameter of 1.96. Catalyst activity was 420 g.polyethylene/g.solid·hr.·$C_2H_4$ pressure, 20,800 g.polyethylene/g.Ti·hr.·$C_2H_4$ pressure.

EXAMPLE 12

A 2 liter stainless steel autoclave equipped with an induction stirrer was purged with nitrogen, in which were then placed 50 mg of the solid obtained in Example 1, 1,000 ml of hexane and 2 millimoles of triethylaluminum, and the temperature was raised to 70° C. Hydrogen was introduced to a total pressure of 5.5 kg/cm.$^2$G and an ethylene-propylene mixture containing 2 mole% of propylene was then fed to maintain the pressure in the autoclave at 10 kg/cm.$^2$ while a polymerization was conducted for 1 hour, to yield 130 g of a white polymer with a melt index of 0.30 containing 6.1 methyl groups per 1,000 carbon atoms. The polymer had an extremely large flow parameter of 1.91. Catalyst activity was 580 g.polymer/g.solid·hr.·$C_2H_4$ pressure.

We claim:

1. A process for preparing polyolefins which comprises polymerizing or copolymerizing olefins using as catalyst a solid carrier component containing a titanium compound and/or a vanadium compound, and an organoaluminum compound and/or an organozinc compound, said solid component being obtained by copulverizing (1) a magnesium dihalide and/or a manganese dihalide, (2) an aluminum oxyhalide and (3) a titanium compound and/or a vanadium compound.

2. A process according to claim 1 wherein the magnesium dihalide is magnesium chloride and the manganese dihalide is manganese chloride.

3. A process according to claim 1 wherein the aluminum oxyhalide is the product resulting from a thermal decomposition of aluminum chloride etherate.

4. A process according to claim 1 wherein the titanium compound is a tetravalent or trivalent titanium compound, or a mixture thereof.

5. A process according to claim 1 wherein the vanadium compound is vanadium oxytrichloride, dichloroethoxyvanadyl, triethoxyvanadyl, vanadium tetrachloride, vanadium trichloride, or a mixture thereof.

6. A process according to claim 1 wherein the molar ratio of magnesium dihalide and/or manganese dihalide to aluminum oxyhalide is in the range of from 1:100 to 100:1.

7. A process according to claim 1 wherein the solid component contains titanium and/or vanadium in an amount ranging from 0.5 to 20 weight percent.

8. A process according to claim 1 wherein the polymerization or copolymerization of olefin is carried out at a temperature in the range of from 20° to 300° C and at a pressure in the range of from normal pressure to 70 kg/cm$^2$.

9. A process according to claim 1 wherein the polymerization or copolymerization of olefin is carried out with hydrogen added into the polymerization system.

10. A process according to claim 1 wherein the olefin is ethylene, propylene or 1-butene.

* * * * *